United States Patent [19]

Pearson et al.

[11] 4,287,965

[45] Sep. 8, 1981

[54] HOIST PAD

[76] Inventors: Alan D. Pearson; Gary L. Pearson, both of 1127 Cliff Rd., Burnsville, Minn. 55337

[21] Appl. No.: 84,799

[22] Filed: Oct. 15, 1979

[51] Int. Cl.[3] .............................................. B60S 13/00

[52] U.S. Cl. .................................... 187/8.75; 254/2 C

[58] Field of Search ..................... 187/8.41, 8.67, 8.65, 187/8.75, 8.45; 254/2 C

[56] References Cited

U.S. PATENT DOCUMENTS

| | | | |
|---|---|---|---|
| 2,659,455 | 11/1953 | Green | 187/8.75 |
| 3,205,977 | 9/1965 | Goldzwig et al. | 187/8.75 |
| 3,243,015 | 3/1966 | Swick, Jr. | 187/8.75 |
| 3,921,762 | 11/1975 | Provine | 187/8.75 |

*Primary Examiner*—Robert J. Spar
*Assistant Examiner*—Kenneth Noland
*Attorney, Agent, or Firm*—Burd, Bartz & Gutenkauf

[57] ABSTRACT

A hoist pad mounted on a lift arm of a hoist to support a vehicle on the lift arm. The pad has a frame that fits over the top and sides of a part of the lift arm. A base is pivoted to the frame. The base supports a lift assembly in a plurality of positions to change the effective height of the lift assembly to accommodate for variations in vehicle frame and exhaust structure. The lift assembly has two legs articuately connected together and locatable in selected positions to provide variations in the effective height of the lift assembly.

36 Claims, 12 Drawing Figures

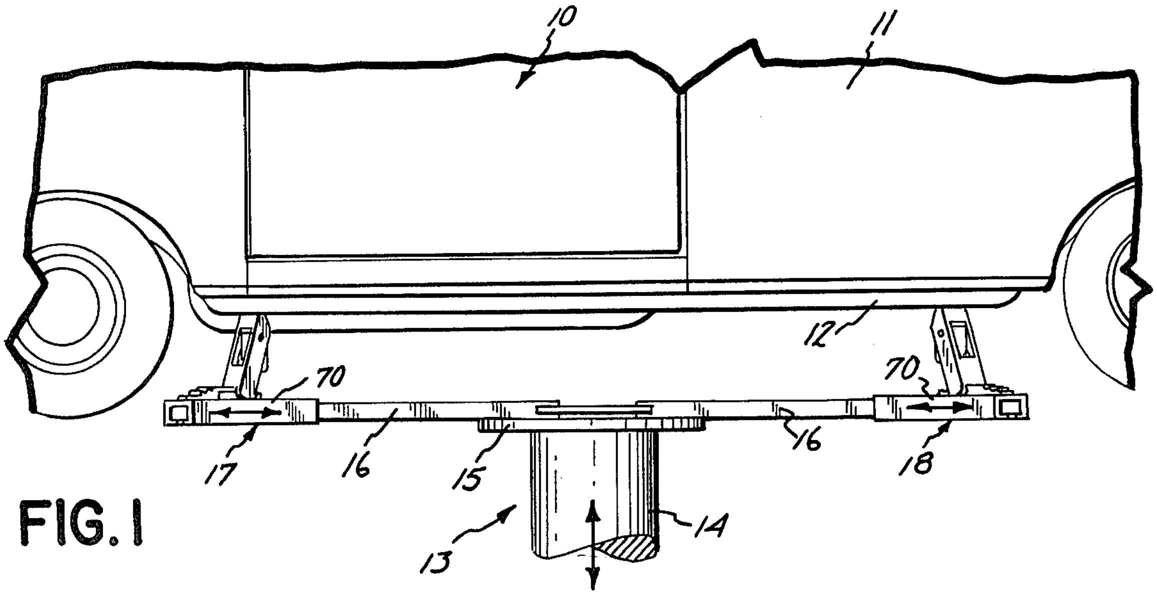
FIG. 1
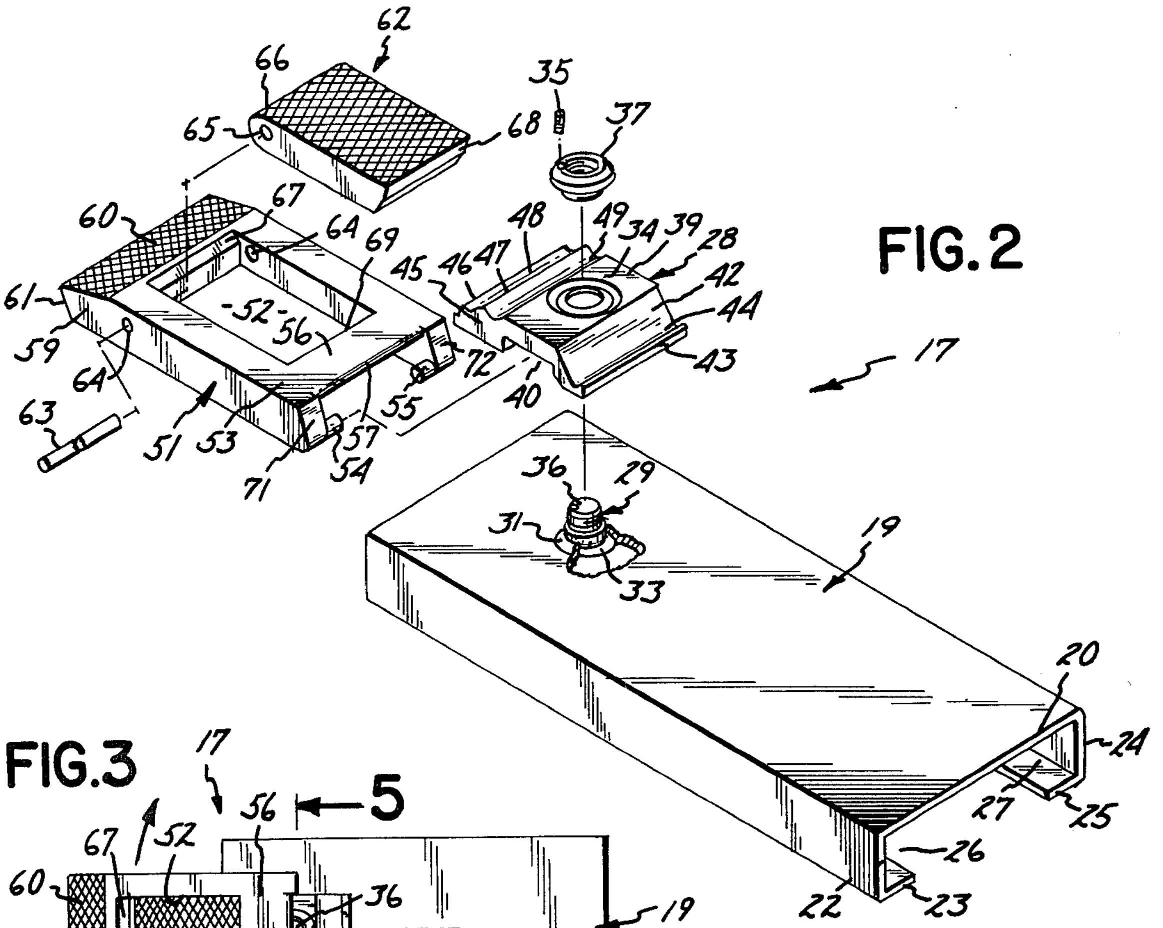
FIG. 2
FIG. 3
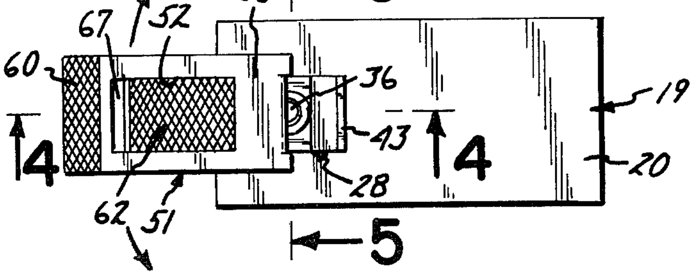

FIG. 4
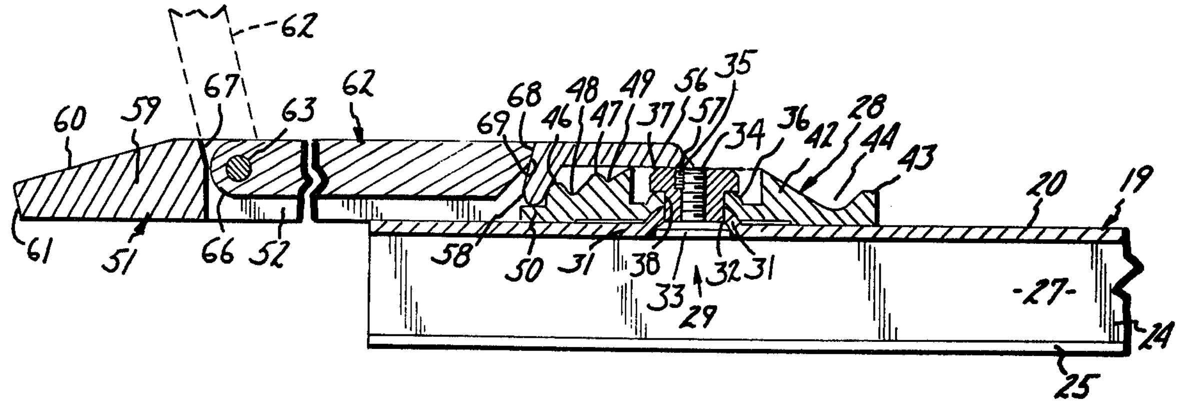
FIG. 5
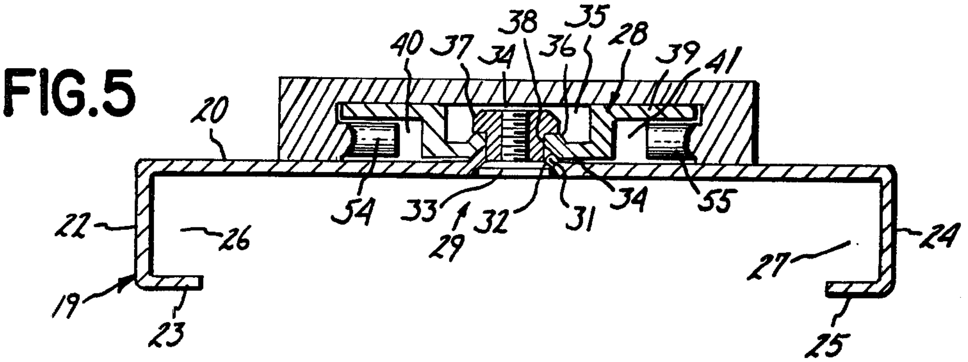
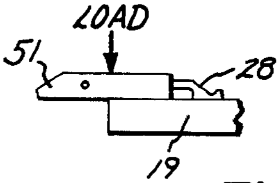
FIG. 6
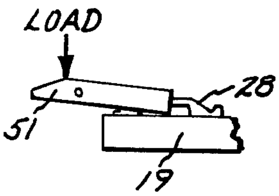
FIG. 7
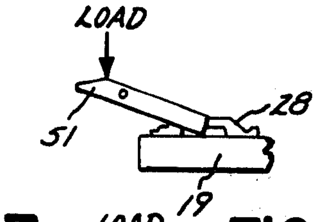
FIG. 8
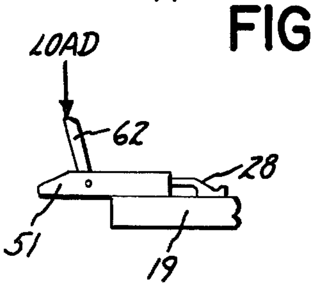
FIG. 9
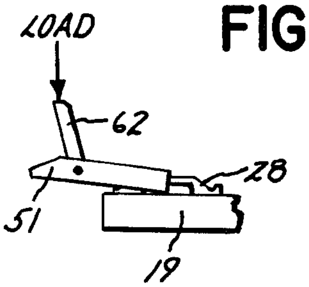
FIG. 10
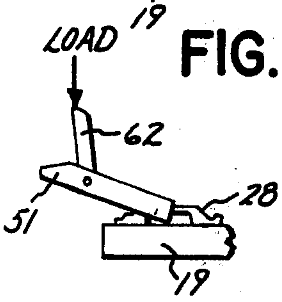
FIG. 11
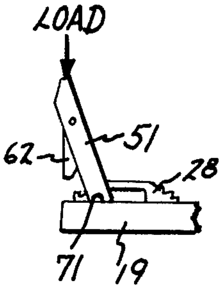
FIG. 12

HOIST PAD

SUMMARY OF INVENTION

The invention is directed to an apparatus used in association with a lifting device to position an object on the lifting device. More particularly, the invention is a hoist pad adapted to be mounted on a lift arm of a hoist used to service and repair motor vehicles. The hoist pad has a frame located on the arm of a hoist. The frame can accommodate different size and designs of lift arms so that the hoist pad is useable with different hoists without altering the lift arm or frame structure. The location of the frame on the lift arm can be changed as the frame is slidably mounted on the arm. A base is supported on the frame. The base is retained on the frame with a pivot means which allows the base to rotate 360 degrees.

A lift assembly mounted on the base is engageable with the vehicle frame to support part of the vehicle. The entire vehicle is supported on a plurality of hoist pads. The lift assembly can be set up in a number of positions to change its effective height to accommodate for variations in the vehicle frame and exhaust structure. The lift assembly has a leg or member movably mounted on the base. The base and member have cooperating means which permit the member to be located in separate positions to change the effective height of the lift assembly. The cooperating means includes a plurality of transverse grooves in the base. The grooves located at different elevations are in an ascending step order. The cooperating means also includes a transverse rib on the member locatable in one of said grooves. The rib can be moved to other grooves to change the effective height of the lift assembly. The member can be located in a generally upright position with its lower end resting on the frame.

The lift assembly has a second leg or member pivotally mounted on the outer end portion of the first member. The second member is movable to an up position into engagement with a first stop on the first member. When the second member is in the up position, it projects laterally and upwardly from the top of the first member to increase the effective height of the lift assembly. The second member can be moved from the up position to a down position where it does not interfere with the function of the first member. The first member has an opening accommodating the second member when it is in the down position.

The hoist pad is versatile in use, as it is constructed to fit major hoist and lift equipment that is presently in use. The lift assembly is movable to several positions to accommodate a wide range of vehicles, including foreign made vehicles, four-wheel drive vehicles, van type vehicles, pickup trucks, as well as conventional automobiles. The parts of the hoist pad are easily replaced and can be obtained separately to minimize time, labor and cost of servicing.

IN THE DRAWINGS

FIG. 1 is a fragmentary side elevational view of a motor vehicle located on a lift hoist equipped with the hoist pads of the invention;

FIG. 2 is an exploded perspective view of a hoist pad of the invention;

FIG. 3 is a top plan view of the hoist pad;

FIG. 4 is an enlarged sectional view taken along the line 4—4 of FIG. 3;

FIG. 5 is an enlarged sectional view taken along the line 5—5 of FIG. 3;

FIG. 6 is a side fragmentary elevational view showing the lift leg in its first position;

FIG. 7 is a side fragmentary elevational view of the hoist pad showing the lift assembly in a second position;

FIG. 8 is a fragmentary side elevational view of the lift pad showing the lift assembly in a third position;

FIG. 9 is a fragmentary side view of the hoist pad showing the lift assembly in a fourth position;

FIG. 10 is a fragmentary side view of the hoist pad showing the lift assembly in a fifth position;

FIG. 11 is a fragmentary side view of the hoist pad showing the lift assembly in a sixth position; and FIG. 12 is a side fragmentary elevational view of the hoist apparatus showing the lift assembly in a seventh position.

DESCRIPTION OF PREFERRED EMBODIMENT

Referring to FIG. 1, there is shown a vehicle indicated generally at 10 having a body 11 and a longitudinal bottom frame 12. Vehicle 10 can be a motor vehicle, including, but not limited to, a passenger car, four-wheel drive vehicle, van and pickup truck vehicles, compact and sub-compact vehicles. Other types of vehicles can be used with the hoist pads of the invention to elevate the vehicles for inspection, servicing and repair.

A lift apparatus or hoist indicated generally at 13 is used to elevate vehicle 10 above a supporting surface, such as a ground or floor. Hoist 13 has a center supporting lift post 14. A platform 15 is mounted on top of post 14. A plurality of lateral arms 16 extend horizontally from platform 15. A conventional hoist has four arms extended in pairs from opposite sides of platform 15. Arms 16 are movably mounted on platform 15 so that they can be positioned under selected parts of the frame of the vehicle. A fluid control system (not shown), such as air or hydraulic fluid, is used to elevate post 14 to raise the vehicle above the supporting surface.

Hoist pads indicated generally at 17 and 18 are carried by the outer ends of arms 16. Each arm carries a hoist pad. Hoist pads 17 and 18 provide a supporting or connecting link between an arm and the vehicle frame. Each arm carries a hoist pad adapted to engage a separate portion of the vehicle frame. The hoist pads 17 and 18 are identical in construction and use. The following description is limited to hoist pad 17.

Hoist pad 17 has a frame indicated generally at 19 adapted to be mounted on the end of arm 16. Frame 19 can be located at any selected position along the length of the arm. Frame 19 has a generally rectangular flat top wall 20. A first side wall 22 extends downwardly from one side edge of wall 20 and terminates in an inwardly directed longitudinal flange 23. The opposite side edge of top wall 20 has a second downwardly directed side wall 24 terminating in an inwardly directed flange 25. Flanges 23 and 25 are located in generally the same horizontal plane below the plane of top wall 20. Flange 23 and top wall 20 form a longitudinal first pocket or channel 26 for accommodating an edge of arm 16. Flange 25 forms with the top wall 20 a second pocket or channel 27 accommodating the opposite or inside edge of arm 16. Pockets 26 and 27 allow the frame 19 along the length of arm 16 to locate the hoist pad in a desired location on the arm.

A base indicated generally at 28 is mounted on one end of top wall 20 with a pivot means indicated generally at 29. Pivot means 29 allows the base to pivot or swivel 360 degrees. As shown in FIGS. 4 and 5, pivot means 29 is a nut and bolt assembly 30 mounting base 28 on wall 20. Wall 20 has an upwardly directed flange or dome 31 having a hole 32. The upper surface of dome 31 has a convex or arcuate shape. Nut and bolt assembly 30 has a bolt head 33 located in the recess surrounded by dome 31 and a threaded end 34 projected upwardly through hole 32. Head 33 is connected by a weld or the like to dome 31. Base 28 has an upwardly annular directed flange or rib 36 that tapers inwardly and rests on top of dome 31. The inside surface or rib 36 is concave and located in surface contact with the convex upper surface of dome 31 to form a ball and socket arrangement. A nut 37 having a short annular portion or neck extends down into a hole 38 in rib 36 and bears against the top of head 33 to limit clamping of base 28 on top wall 20 to allow base 28 to be rotated 360 degrees about the upright axis of pivot means 29. The engaging convex and concave surfaces of dome 31 and flange 36 are bearing surfaces which permit base 28 to rotate about a generally upright axis of pivot means 29 with a minimum of binding of the parts together. A set screw 35 is located in a suitable threaded hole in the upper end of threaded end 34 to hold nut 37 in a locked position on end 34.

Base 28, as shown in FIGS. 2, 4, and 5, has a center section 39 provided with bottom grooves or side pockets 40 and 41. Pockets 40 and 41 are open to the opposite sides of section 39 adjacent opposite sides of hole 34. Hole 34 is in the approximate center of section 39. A first side section 42 is integral with the right side of center section 39, as shown in FIGS. 2 and 4. Side section 42 extends downwardly and outwardly and has a bottom surface that rests on the top surface of wall 20. The outer edge of first side section 42 terminates in an upwardly directed transverse lip or rib 43. Lip 43 forms a transverse groove 44 having a generally transverse concave shape, as shown in FIG. 4. A second side section 45 is joined to the left side of center section 39. Second side section 45 has two laterally spaced transverse lips or ribs 46 and 47 forming a pair of grooves 48 and 49. As shown in FIG. 4, groove 49 is at a higher elevation above top wall 20 than groove 48. The top of shoulder 50, and grooves 48 and 49 have an ascending step relationship or order from the outer edge toward the pivot axis. The ribs 46 and 47 project in an upward direction and are continuous in the transverse direction of base 28. The side section 45 has a transverse end or shoulder 50 that bears against the top surface of top wall 20.

A lift assembly or means having a first lift member or leg indicated generally at 51 movably mounted on base 28 is engageable with the vehicle frame 12 to support part of the vehicle. The lift assembly can be set up in a number of positions to change its effective height to accommodate for variations in vehicle frame design and exhaust muffler and pipe structures. Lift member 51 has a rectangular member having a generally rectangular central hole 52 separating a first inner section 53 from a second outer section 59. The first section 53 has a pair of inwardly directed projections or nipples 54 and 55 that extend into side pockets 40 and 41, respectively. Inner end section 53 has a transverse top wall 56, which terminates in an inner transverse end 57. As shown in FIG. 4, the outer end of wall 56 has a downwardly and outwardly directed flange or rib 58. When lift member 51 is in a first or down position, flange 58 rests on shoulder 50 and the sides of member 51 rest on top wall 20. Lift member 51 has a second or outer end section 59 extended transversely of the outer or right end of opening 52. Outer end section 59 has a downwardly and outwardly inclined top surface 60 and a downwardly and inwardly directed transverse end 61. The top surface 60 and end 61 have knurled or interrupted textured surfaces.

The lift assembly has a second lift member or leg indicated generally at 62 pivotally mounted on first lift member 51 with a transverse pivot pin 63. As shown in FIG. 2, transverse pivot pin 63 fits through aligned holes 64 in the sides of lift member 51 and a hole 65 in the outer end of lift member 62. Lift member 62 is a solid metal block having a generally rectangular shape of a size to fit into rectangular hole 52 in the first lift member 51. The outer or pivot end 66 of lift member 62 has a semi-circular shape so as to clear a tapered face or stop wall 67 on the inside wall of the second end section 59. The second lift member is adapted to be pivoted to an up position whereby the top of member 62 bears against the face 67 when the second lift member is in its generally upright position, as shown in FIGS. 9–11. The outer or free end of lift member 62 has a transverse tapered end 68 which rests against a downwardly and outwardly inclined face 69 on flange 58 when lift member 62 is in the down or in position, as shown in FIG. 4.

In use, first and second lift members 51 and 62, respectively, function to provide a selected support elevation for frame 12 of the vehicle above lift arms 16. The lift pads 17 and 18 can be adjustably positioned on arms 16, since they can move along the longitudinal length of the arms, as indicated by the arrows 70 in FIG. 1. If the vehicle 10 has a short frame, hoist pads 17 and 18 and accompanying hoist pads on the opposite lift arms are moved in or toward the center post 14. The lift assembly comprising lift members 51 and 62 is adjusted to a height so that the upper ends thereof are closely adjacent the vehicle frame. The hoist 17 is then actuated to lift the vehicle 10 to a selected working height. FIGS. 6–12 show seven positions in which the lift assembly can be located. The positions enable the operator to select the effective height of the lift assembly to provide clearance between the hoist frame and the bottom of the vehicle. This clearance is necessary in some types of vehicles to avoid contact with exhaust structures, such as exhaust pipes and mufflers.

In FIG. 6, the second lift member 62 is located within the rectangular hole or recess 52 of lift member 51. Lift member 51 is in a horizontal low position and rests on the top surface 20 of frame 19.

FIG. 7 shows the lift member 51 at an upwardly inclined first position. The transverse flange 58 is located in the transverse groove 59. The projections 54 and 55 slide in the pockets 40 and 41. When a load is applied to lift member 51 the projections 54 and 55 bear on the bottom of center section 39 and flange 58 rests on side section 45 of base 28.

FIG. 8 shows the first lift member 51 in a second elevated position. The second lift member is in recess 52. The transverse flange 58 is located in the second transverse groove 49. Since groove 49 is at a higher elevation than groove 48, lift member 51 is located at a higher angle or elevation than shown in FIG. 7. Projections 54 and 55 contact the bottom side of base 28.

FIG. 9 shows second lift member 62 in its folded open or up position. The first lift member 51 is in its lowered position, similar to FIG. 6. The lower end of the top of lift member 62 bears against the inclined face 67, as shown in broken lines in FIG. 4. The load is applied to the upper or free end of member 62.

FIGS. 10 and 11 show the second lift member 62 in its up or open position. The first lift member 51 is in the inclined position in accordance with the positions of FIGS. 7 and 8.

FIG. 12 shows the first lift member 51 located in its generally upright position. Member 51 has inner or lower end members 71 and 72, as shown in FIG. 2, resting on the top wall 20 of frame 19. The projections 54 and 55 bear against the bottom of the center section 39 to maintain the first lift member in its upright position. When lift member 51 is in the upright position, as shown in FIG. 12, it is inclined in an outward direction whereby ends 71 and 72, in conjunction with projections 54 and 55, prevent further pivoting of lift member 51 in a clockwise direction. Lift member 51 is free to pivot or fold back to the lower or flat position, as shown in FIG. 6. This is done by pivoting it in the clockwise direction, as viewed in FIG. 12.

While there has been shown and described a preferred embodiment of the hoist pad of the invention, it is understood that changes in materials, structures, size of the structures, and arrangement of the structures can be made by those skilled in the art without departing from the invention. The invention is defined in the following claims.

The embodiments of the invention in which an exclusive property or privilege is claimed are defined as follows:

1. A hoist pad useable with a lift arm of a hoist to support a part of a load comprising: frame means mountable on a lift arm, a base supported on the frame means, said base including side pockets, means attaching the base to the frame means, and a lift assembly mounted on the base and engageable with a load to support a part of the load on the hoist pad, said lift assembly having a first member movably mounted on the base, said first member including means located in said side pockets to movably mount the first member on the base, said first member and base having first cooperating means which permit the first member to be located in separate locations relative to the frame means, said first cooperating means including a plurality of transverse grooves located at different elevations in said base, said first member having a rib selectively locatable in one of said grooves to locate the first member in a selected position relative to the base, and a second member movably mounted on the first member, said first and second members having second cooperating means selectively locating the second member in a first down position and a second up position whereby the first and second members can be positioned relative to each other to change the effective lifting height of the hoist pad.

2. The pad of claim 1 wherein: said frame means includes means cooperating with the lift arm to locate the hoist pad at a selected position on said lift arm.

3. The pad of claim 1 wherein: said frame means has side walls and flanges providing channels for accommodating portions of the lift arm whereby the hoist pad can be moved in a selected position on said lift arm.

4. The pad of claim 1 wherein: the means attaching the base on the frame means includes pivot means pivotally mounting the base on the frame means for movement about a normally upright axis.

5. The pad of claim 4 wherein: said base has separate sections located on opposite sides of the pivot means engageable with the frame means.

6. The pad of claim 5 wherein: said frame means has a surface surrounding the pivot means, said separate sections of the base being engageable with said surface.

7. The pad of claim 1 wherein: said transverse grooves are arranged in an ascending step order.

8. The pad of claim 1 wherein: said second cooperating means includes a stop on the first member engageable with the second member when the second member is in the second up position.

9. The pad of claim 1 including: pivot means to movably mount the first member on the second member.

10. The pad of claim 9 wherein: said second cooperating means includes a first stop on the first member engageable with the second member when the second member is in the second up position, and a second stop on the first member engageable with the second member when the second member is in the first down position.

11. The pad of claim 10 wherein: said first member has an opening of a size to accommodate the second member when the second member is in the first down position.

12. The pad of claim 1 wherein: said first member has end means engageable with the frame means and cooperating with the base to support the first member in a generally upright position.

13. A hoist pad useable with a lift arm of a hoist to support a part of a load comprising: frame means mountable on a lift arm, a base supported on the frame means, means attaching the base to the frame means, and a lift assembly mounted on the base and engageable with a load to support a part of the load on the hoist pad, said lift assembly having a first member movably mounted on the base, said first member and base having first cooperating means which permits the first member to be located in separate locations relative to the frame means, said first cooperating means including a plurality of transverse grooves located at different elevations in said base, said first member having means selectively locatable in one of said grooves to locate the first member in a selected elevated position relative to the base, and a second member movably mounted on the first member, said first and second members having second cooperating means selectively locating the second member in a first down position and a second up position whereby the first and second members can be positioned relative to each other to change the effective lifting height of the hoist pad.

14. The pad of claim 13 wherein: said transverse grooves are arranged in ascending step order.

15. The pad of claim 13 wherein: said second cooperating means includes a stop on the first member engageable with the second member when the second member is in the second up position.

16. The pad of claim 13 wherein: said second cooperating means includes a first stop on the first member engageable with the second member when the second member is in the second up position, and a second stop on the first member engageable with the second member when the second member is in the first down position.

17. The pad of claim 16 wherein: said first member has an opening of a size to accommodate the second member when the second member is in the first down position.

18. The pad of claim 13 wherein: said first member has an opening of a size to accommodate the second member when the second member is in the first down position.

19. The pad of claim 13 wherein: said frame means has an upwardly directed dome portion surrounding the pivot means, said base having annular means engageable with said dome portion.

20. The pad of claim 19 wherein: said dome portion has a convex annular surface, said annular means having a concave annular surface engageable with said convex annular surface.

21. An apparatus useable with a hoist to support a part of a load comprising: frame means mountable on the hoist, a base supported on the frame means, said base having side pockets, means attaching the base to the frame means, and a lift assembly mounted on the base and engageable with the load to support at least a part of the load on said apparatus, said lift assembly including a member movably mounted on the base, said member including means located in said side pockets to movably mount the member on the base, said member and base having cooperating means which permit the member to be located in separate elevated locations relative to the frame means, said cooperating means including a plurality of transverse grooves located at different elevations in said base, said member having means selectively rotatable in one of said grooves to locate the member in a selected elevated position relative to the base, said member engageable with the load to support said load at a selected elevation.

22. The apparatus of claim 21 wherein: said frame means includes means cooperating with the hoist to locate the apparatus at a selected position on said hoist.

23. The apparatus of claim 21 wherein: the means attaching the base on the frame means includes pivot means pivotally mounting the base on the frame means for movement about a normally upright axis.

24. The apparatus of claim 23 wherein: said frame means has an upwardly directed dome portion surrounding the pivot means, said base having annular means engageable with said dome portion.

25. The apparatus of claim 24 wherein: said dome portion has a convex annular surface, said annular means having a concave annular surface engageable with said convex annular surface.

26. The apparatus of claim 23 wherein: said base has separate sections located on opposite sides of the pivot means engageable with the frame means.

27. The apparatus of claim 23 wherein: said frame means has a surface surrounding the pivot means, said separate sections of the base being engageable with said surface.

28. The apparatus of claim 21 wherein: said transverse grooves are arranged in ascending step order.

29. An apparatus useable with a hoist to support a part of the load comprising: frame means mountable on the hoist, a base supported on the frame means, means attaching the base to the frame means, and a lift assembly mounted on the base and engageable with the load to support at least a part of the load on said apparatus, said lift assembly including a member movably mounted on the base, said member and base having cooperating means which permit the member to be located in separate elevated locations relative to the frame means, said cooperating means includes a plurality of support surfaces located at different elevations in said base, said member having means selectively engageable with one of said support surfaces to locate the member in a selected elevated position relative to the base, said member engageable with the load to support said load at a selected elevation.

30. The apparatus of claim 29 wherein: said support surfaces are one part of transverse grooves arranged in ascending step order.

31. The apparatus of claim 29 wherein: said member has end means engageable with the frame means and cooperating with the base to support the member in a generally upright position.

32. The apparatus of claim 29 wherein: the means attaching the base on the frame means includes pivot means pivotally mounting the base on the frame means for movement about a normally upright axis.

33. The apparatus of claim 32 wherein: said frame means has an upwardly directed dome portion surrounding the pivot means, said base having annular means engageable with said dome portion.

34. The apparatus of claim 33 wherein: said dome portion has a convex annular surface, said annular means having a concave annular surface engageable with said convex annular surface.

35. The apparatus of claim 32 wherein: said base has separate sections located on opposite sides of the pivot means engageable with the frame means.

36. The apparatus of claim 32 wherein: said frame means has a surface surrounding the pivot means, said separate sections of the base being engageable with said surface.

* * * * *